United States Patent [19]
Kuan

[11] Patent Number: 5,606,307
[45] Date of Patent: Feb. 25, 1997

[54] CONTROL CIRCUIT FOR AN AUTOMOBILE

[76] Inventor: Jack Kuan, 5th Fl., No. 8-4, Lane 30, Wuchuan St., Panchiao City, Taipei Hsien, Taiwan

[21] Appl. No.: 564,557

[22] Filed: Nov. 29, 1995

[51] Int. Cl.⁶ ..................................................... B60R 25/10
[52] U.S. Cl. ........................ 340/426; 180/287; 307/10.3; 340/428; 340/430; 379/44
[58] Field of Search ..................................... 340/426, 428, 340/429, 430; 180/287; 307/10.2, 10.3, 10.4, 10.5, 10.6; 379/57, 58, 59, 44, 60, 63, 37–40

[56] References Cited

U.S. PATENT DOCUMENTS

| | | | |
|---|---|---|---|
| 5,335,264 | 8/1994 | Namekawa | 379/58 |
| 5,418,537 | 5/1995 | Bird | 342/357 |
| 5,432,495 | 7/1995 | Tompkins | 340/429 |
| 5,490,200 | 2/1996 | Snyder et al. | 379/57 |

Primary Examiner—Nina Tong
Attorney, Agent, or Firm—Hedman, Gibson & Costigan, P.C.

[57] ABSTRACT

A control circuit for an automobile having an ignition switch with an ACC position and a start position, a starter motor, and an ignition coil which includes a pager circuit for receiving a digital signal from a telephone company resulting from a telephone call made thereto, a control code register connected with the pager circuit for storing the control codes from the pager circuit, a power circuit for supplying the electric power required by the control circuit, an alarm driving circuit, an activating circuit of an automobile door for receiving a signal from the control code register and activating the alarm driving circuit when the door is opened by an unauthorized person, a starter motor controlling circuit for turning off the starter motor when it receives an activating signal therefrom and when the ignition switch is in the ACC position and activating the alarm driving circuit when the ignition switch is in the start position, an ignition coil cut-off circuit for cutting off the ignition coil, and a central-control door lock activating circuit for controlling the door locks in response to the signal therefrom.

7 Claims, 2 Drawing Sheets

CONTROL CIRCUIT FOR AN AUTOMOBILE

BACKGROUND OF THE INVENTION

The present invention relates to a control circuit for automobiles, and particularly to a control circuit in cooperation with a personal radio paging unit to achieve a multi-functional control to automobiles.

In recent years, remote controllers have been widely used in anti-theft apparatus for automobiles. However, as the power of the remote controllers is limited, the remote controller can only be properly operated within a short distance range. Thus, once a thief has stolen a car and left the location where the car was parked, the provision of the remote controller and a corresponding circuit related thereto will be in vain.

Therefore, an anti-theft system for automobiles employing a personal radio paging unit has been developed. In the present system, an anti-theft circuit is installed within the car directly in electrical connection with a ring output of the personal radio paging unit. Once the car owner discovers the car has been stolen, the car owner may control the car by way of dialing a telephone. The personal radio paging unit within the car will receive a radio signal generated based on a signal transmitted from the calling telephone and generate an activating signal to turn on the anti-theft circuit thereby cutting off the power and the ignition coil circuits of the car and turning on an alarm within the car. However, such a system merely uses a ringing signal from the personal radio paging unit to disable/enable the circuits within the car and perform an anti-theft function without controlling other parts of the car such as door lock knobs. Thus, the car owner has to additionally carry a remote controller to control the remaining part of the car.

SUMMARY OF THE INVENTION

An objective of the present invention is to provide a control circuit to overcome the specific shortcoming of the conventional anti-theft system for automobiles.

According to the present invention, a control circuit for an automobile includes a pager circuit for receiving a digital signal that includes sequences of control codes from a telephone company resulting from a telephone call made thereto, a control code register connected with the pager circuit for storing the control codes from the pager circuit, a power circuit having a regulation circuit for regulating an electric power source from the automobile for supplying the electric power required by the control circuit, an alarm driving circuit for outputting audio signals to indicate the automobile is being stolen, an activating circuit of an automobile door, said activating circuit connected to the alarm driving circuit for receiving a signal from the control code register and activating the alarm driving circuit when the door is opened by an unauthorized person, a starter motor controlling circuit connected to the alarm driving circuit and the control code register for turning off a starter motor when it receives an activating signal therefrom and when the ignition switch is in the ACC position and activating the alarm driving circuit when the ignition switch is in the start position, an ignition coil cut-off circuit connected to the control code register for cutting off the ignition coil, and an actuating circuit for door lock knobs in connection with the control code register for controlling the door locks in response to the signal therefrom.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
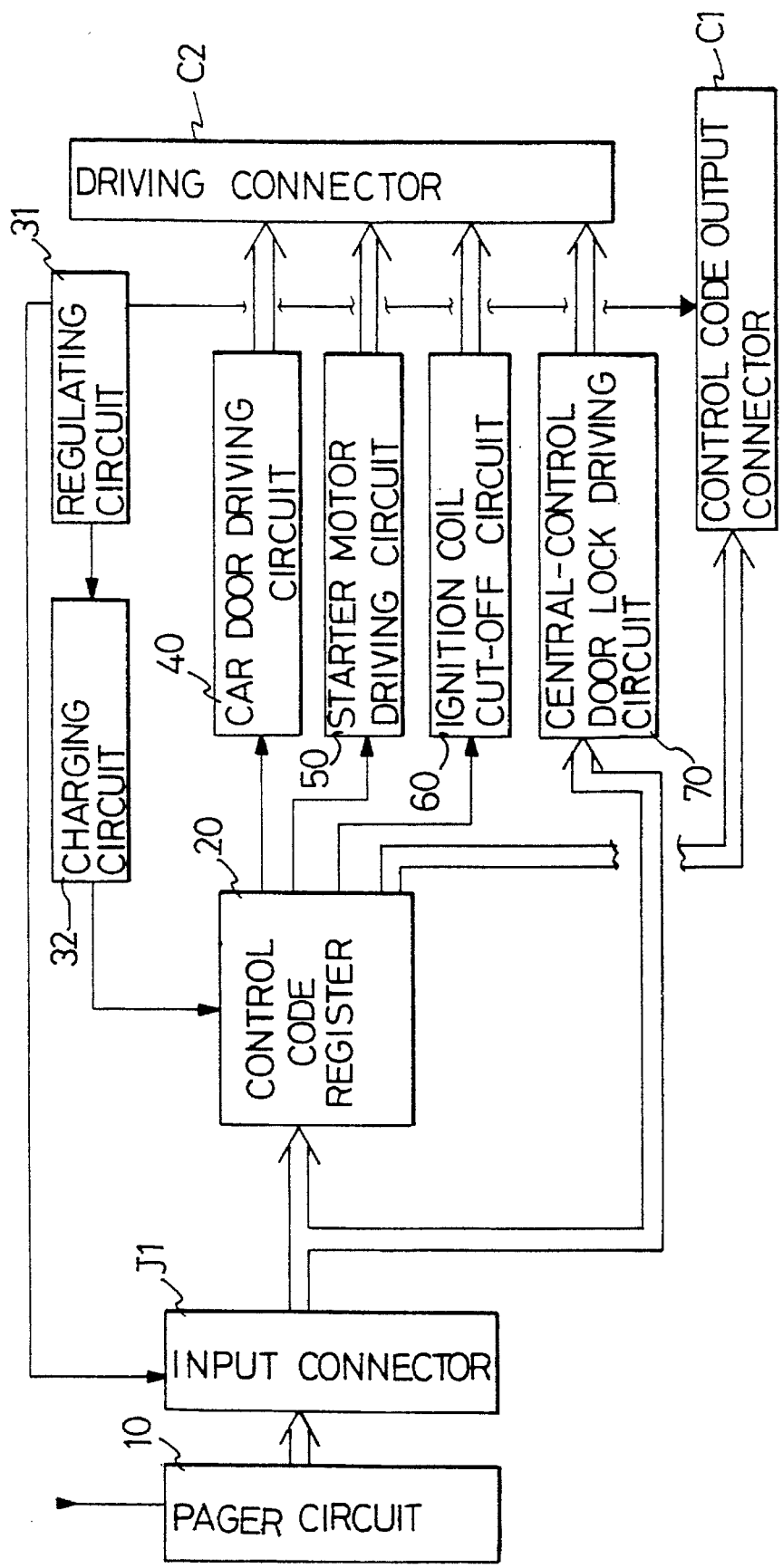
FIG. 1 is a block diagram of the control circuit of the present invention.

Referring to FIG. 1, there is shown a block-diagram of an automobile control circuit in accordance with the present invention. The control circuit includes a pager circuit 10 for receiving a digital signal having sequences of control codes from a telephone company, a control code register 20 for receiving the control codes from the pager circuit via an input connector J1, a power supply circuit composed of a regulating circuit 31 and a charging circuit 32 for supplying electrical power to the control code register 20, a car door driving circuit 40 for guarding against unauthorized entry through a car door, a starter motor driving circuit 50, an ignition coil cut-off circuit 60, a central-control door-lock driving circuit 70, a control code output connector C1 and a driving connectors C2 connected to the circuits 40, 50, 60, and 70 for further connecting to related circuits of the automobile.

In this embodiment, all the control codes outputted from the pager circuit 10 act as the control signals of this invention and are sent into the control code register 20 via the input connector J1, then the circuits 40, 50 and 60 will send corresponding driving signals to the driving connector in response to the control code within the control code register.

By the above-mentioned structure, a user may input specific control codes into the control circuit by making a telephone call. Further, the control code output connector C1 in the control circuit may directly transmit the control codes from the pager circuit 10 to other apparatus for further processing and controlling.

Figure 2:
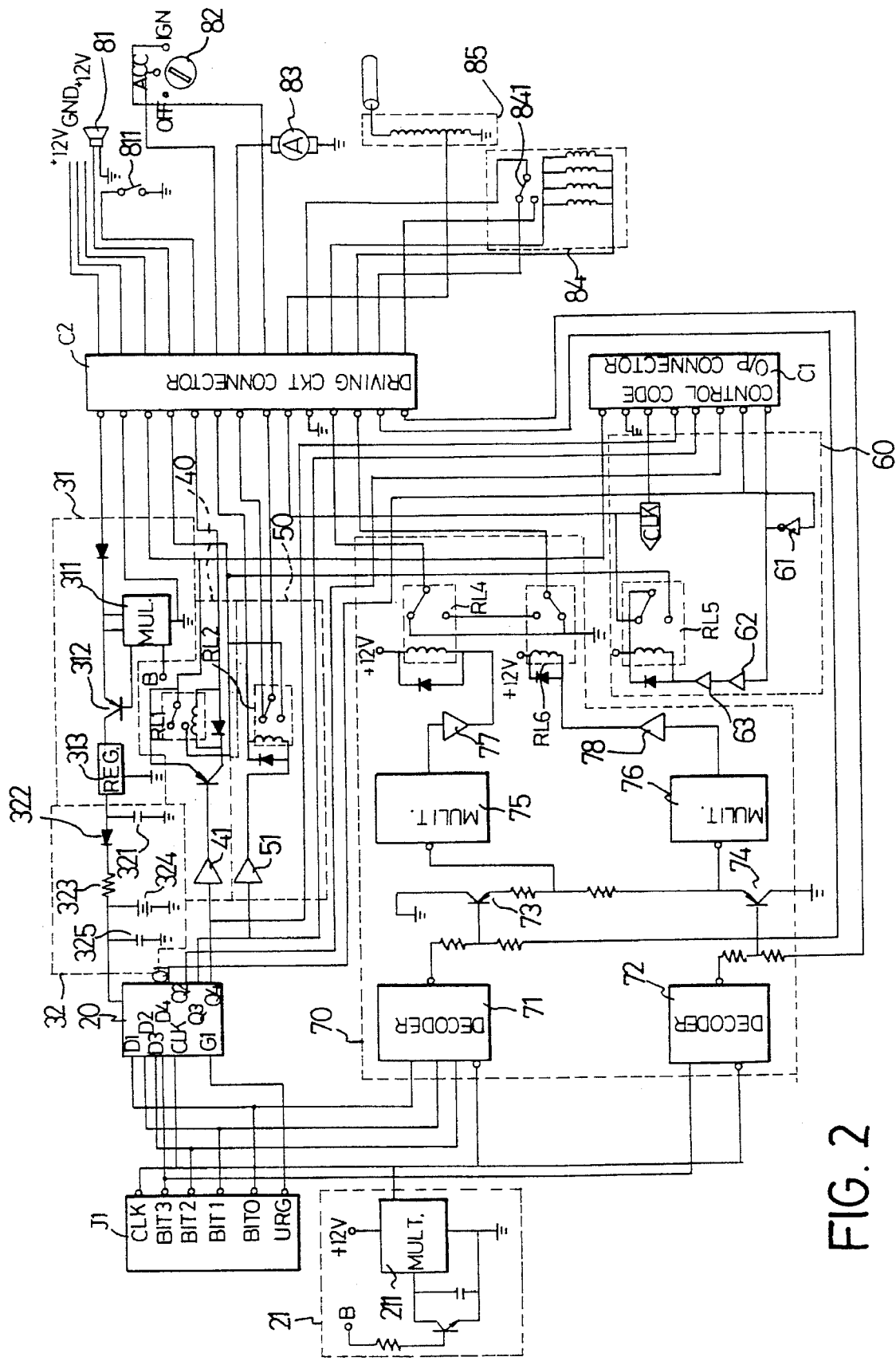
FIG. 2 is a circuit diagram of the control circuit of the present invention.

FIG. 2 shows a detailed schematic circuit diagram of the present invention. The input connector J1 is connected to the pager circuit (not shown). The input connector J1 connected to clock (CLK), bits (bit0–bit3), urge outputs of the pager circuit and transmits these output signals to a respective input (D0–D4) of the control code register 20. The outputs (Q1–Q4) of the control code register 20 are connected to a control code output connector C1 for further processing if needed. A driving circuit connector C2 is connected with a plurality of parts of the automobile for supplying electric power to the circuits of the present invention, which include a power circuit 31 composed of a transistor 312, a voltage regulator 313 and an astable multivibrator 311 provides the electric power required by the circuits. The astable multivibrator 311 forms a delay circuit (about 0.5 second) to provide a delayed power-on effect for the power circuit 31 to prevent the problems of surge waves and instability of the circuit, as a first output of the astable multivibrator 311 is connected with the base of the transistor 312. Furthermore, a second output of the astable multivibrator 311 is connected to a filter circuit 21, which is composed of an astable multivibrator 211, to activate the control code register 20 after a predetermined time (about 1 second).

Additionally, the power circuit 31 charges a rechargeable battery 324 through a charging circuit 32, which is composed of two filter capacitors 321 and 325, a diode 322, and a resistor 323 so that the rechargeable battery 324 will continue to supply electric power to the control code register 20 when the power circuit is turned off. The control code register 20 is a device of low-power-consuming component which may continue to operate for about 3000 hours with a power supplied by the battery 324. By these arrangements, the present invention may continue to retain the control codes and prevent the circuits from being cut off by a thief.

The outputs (Q1–Q4) of the control code register 20 are respectively connected to a respective driving circuit, wherein, the output Q4 thereof is connected to an activating circuit of the automobile door and the output Q3 is connected to a starter motor controlling circuit 50. The car door driving circuit 40 comprises a first buffer 41, a first relay RL1 and a transistor 42, said first relay RL1 having one end connected to a door catch/lock 811 and its normally open connection point connected to an alarm 81, respectively, through the driving circuit connector C2. When the output Q4 is in a "Low" status, the transistor 42 is conductive, which indicates to start "door activating function", i.e., when the door is opened, the door switch 811 will turn-on the first relay RL1 so that the electric power will supply power to the alarm 81 through the normally open point of the relay RL1 and thus the alarm 81 will be activated. Otherwise when the output Q4 is in a "High" status, which indicates the "door activating function" is disabled. In the normal status, the first relay RL1 is not energized so that it consumes less power than that of the known prior art and prevents the relay from burning out. As aforementioned, the remaining driving circuits of the present invention are active-low arrangement, thus, these circuits do not consume power when in a "stand-by" status.

The starter motor control drive circuit 50 comprises a buffer 51 and a relay RL2 connected to the output of the second buffer 51. The relay RL2 has an end of the coil thereof connected to a power contact (ACC) of an ignition switch 82, a common point connected to a motor 83, a normally-closed contact connected to an ignition point (IGN) of the ignition switch 82, and a normally-opened contact connected to the alarm 81. When the output Q3 of the control code register 20 is in a "High" status, that indicates the starter motor control circuit is disabled. Otherwise, when the output Q3 is a "Low" status, the normally-closed contact will be activated and disconnects the motor driving circuit (i.e. the motor circuit can not be started as normally) after the switch 82 is in the power contact (ACC), once the ignition switch 82 is further in an ignition position (IGN), the alarm 81 will be turned on. Since the starter motor control circuit 50 is active-low arrangement, thus, it will consume less power. The relay RL2 cuts off the circuits related thereto only when the switch 82 is turned to the power contact (ACC) and activates an alarm only when the switch 82 is turned to the ignition position (IGN), so as to prevent the switch 82 from an illegal ignition.

The output Q1 of the control code register 20 is connected to an ignition coil cut-off circuit 60. The ignition coil cut-off circuit 60 comprises a first inverter 61, a second inverter 62, a buffer 63 and a relay RL5, wherein, the relay RL5 has its common point connected to the positive electrode of the power, its normally-opened contact connected to the alarm 81 and its normally closed contact connected to an ignition coil 85 of the automobile. When the output Q1 is in a "Low" status, the relay RL5 will be turned on thereby disabling the ignition coil 85 and the alarm 81 will be turned on.

The central-control door lock control circuit 70 of the present invention comprises a decoder 71, a transistor 73, an astable multivibrator 75, a buffer 77, a relay RL4, a decoder 72, a transistor 74, an astable multivibrator 76, a buffer 78, and a fifth relay RL6. The input of the decoder 71 is connected to the bit0–bit2 of the input connector J1 while the input of the decoder 72 is connected to the bit3 of the input connector J1. An output Y5 of the decoder 71 and an output Y0 of the decoder 72 respectively activate the astable multivibrators 75, 76 through the transistor 73 and 74. The inverted outputs of the astable multivibrators 75, 76 drive the relays RL4, RL6 through the buffers 77, 78, respectively. The contacts of the relays RL4, RL6 will form a forward/backward circuit in connection to the motor of the central-control door lock circuit 84 in order to rotate the motor in a clockwise or a counter-clockwise direction to unlock or lock the doors. In addition, two selective contacts of a manual control door switch 841 are connected to the bases of the transistors 73, 74 for sending a "Low" status signal to the transistors 73, 74 when the door switch 841 turns to an unlock or lock state, respectively. Then the outputs of the astable multivibrators 75, 76 generate a "Low" status signal for about 0.5 seconds, i.e., send a signal for clockwise or counter-clockwise rotating to the central-control door lock motor 84 to achieve the normal function of the door lock. However, when the decoders 71, 74 receive "1100" from the bit3–bit0 of the input connector J1, the output Y5 of the decoder 71 sends a "Low" status signal to open the central-control gate-lock. When the decoders 71, 74 receive "1000" from the bit3–bit0 of the input connector J1, the decoder 72 will send a "Low" signal to close the door locks.

Although the invention has been explained in relation to its preferred embodiment, it is to be understood that many other possible modifications and variations can be made without departing from the spirit and scope of the invention as hereinafter claimed.

I claim:

1. A control circuit for an automobile having an ignition switch with an ACC position and a start position, a starter motor, and an ignition coil, comprising:

a pager circuit for receiving a digital signal that includes sequences of control codes from a telephone company resulting from a telephone call made thereto;

a control code register connected with the pager circuit for storing the control codes from the pager circuit;

a power circuit having a regulation circuit for regulating an electric power source from the automobile for supplying the electric power source from the automobile for supplying electric power required by the control circuit;

an alarm driving circuit for outputting audio signals to indicate the automobile is being stolen;

an activating circuit of an automobile door, said activating circuit connected to the alarm driving circuit for receiving a signal from the control code register and activating the alarm driving circuit when the door is opened by an unauthorized person;

a starter motor controlling circuit connected to the alarm driving circuit and the control code register for turning off the starter motor when it receives said signal from the control code register and when the ignition switch is in the ACC position, and activating the alarm driving circuit when the ignition switch is in the start position;

an ignition coil cut-off circuit connected to the control code register for cutting off the ignition coil when it receives said signal from the control code register; and a central-control door lock activating circuit in connection with the control code register for controlling door locks in response to the signal therefrom.

2. The control circuit as claimed in claim 1, wherein said power circuit further comprises an astable multivibrator having an output connected with a transistor series-connected to the power source for delaying the power required by the control code register.

3. The control circuit as claimed in claim 1 further comprises a noise filtering circuit having an astable multivibrator with a plurality of inputs receiving the power supplied by the power circuit and a plurality of outputs connected to the control code register.

4. The control circuit as claimed in claim 1, wherein the central-control door lock activating circuit is composed of a first and a second decoders respectively connected to outputs of the pager circuit, two astable multivibrators each respectively receiving an output signal from a corresponding decoder, a buffer, and a relay in cooperation with a door lock control motor for forward and backward rotating a motor.

5. The control circuit as claimed in claim 4, wherein the central-control door lock activating circuit has a transistor connected between each of the decoders and each of the astable multivibrators.

6. The control circuit as claimed in claim 1 further comprising a connector connected to outputs of the control code register.

7. The control circuit as claimed in claim 1 further comprises a connector connected between the control code register and the pager circuit.

* * * * *